US005323635A

United States Patent [19]
Ueno et al.

[11] Patent Number: 5,323,635
[45] Date of Patent: Jun. 28, 1994

[54] AIR FUEL RATIO DETECTING ARRANGEMENT AND METHOD THEREFOR FOR AN INTERNAL COMBUSTION ENGINE

[75] Inventors: Sadayasu Ueno, Katsuta; Takao Sasayama, Hitachi; Seiko Suzuki, Hitachiota; Kanemasa Sato, Katsuta; Shiro Ouchi, Katsuta; Naoki Minami, Katsuta; Norio Hasegawa, Mito, all of Japan

[73] Assignees: Hitachi, Ltd., Tokyo; Hitachi Automotive Engineering Co., Ltd., Ibaraki, both of Japan

[21] Appl. No.: 68,670

[22] Filed: May 28, 1993

[30] Foreign Application Priority Data

Jun. 1, 1992 [JP] Japan .................................. 4-140273

[51] Int. Cl.[5] ........................................... G01N 27/419
[52] U.S. Cl. .................................... 73/23.32; 123/694
[58] Field of Search ............... 73/23.32, 116; 123/693, 123/694, 695, 696; 436/137

[56] References Cited

U.S. PATENT DOCUMENTS

| | | | |
|---|---|---|---|
| 4,121,548 | 10/1978 | Hattori et al. | 73/23.32 X |
| 4,502,444 | 3/1985 | Rubbo et al. | 73/23.32 X |
| 4,601,273 | 7/1986 | Kitahara et al. | 73/23.32 X |
| 4,676,213 | 6/1987 | Itsuji et al. | 123/694 |
| 4,751,907 | 6/1988 | Yamamoto et al. | 73/23.32 X |
| 4,944,274 | 7/1990 | Itsuji et al. | 123/693 |
| 5,231,864 | 8/1993 | Ishida et al. | 73/23.32 |

FOREIGN PATENT DOCUMENTS

| | | | |
|---|---|---|---|
| 62-79344 | 4/1987 | Japan . | |
| 62-267544 | 11/1987 | Japan . | |
| 2-102447 | 4/1990 | Japan . | |
| 80653 | 3/1992 | Japan | 73/23.32 |

*Primary Examiner*—Hezron E. Williams
*Assistant Examiner*—Joseph W. Roskos

[57] ABSTRACT

An air fuel ratio detecting arrangement using a diffusion suppressing type air fuel ratio sensor applicable to an air fuel ratio control unit for an internal combustion engine incorporating an atmospheric air pressure correction circuit in a signal processing and outputting device for correcting an output voltage signal processed therein based on a change in atmospheric air pressure which is detected when a predetermined operating condition of an internal combustion engine is satisfied. A secular change correction circuit included in the signal processing and outputting device detects a change in electromotive force of a concentration cell portion of the air fuel ratio sensor when a predetermined rich air fuel ratio is reached and corrects a reference voltage for the air fuel ratio sensor based on the detected change in electromotive force of the concentration cell portion in addition to an air calibration circuit.

12 Claims, 4 Drawing Sheets

MC : MICROCOMPUTER
CN : CONNECTOR
PS : POWER SOURCE
DRV : POWER SOURCE DRIVER
PCB : PRINTED CIRCUIT BOARD

AIR FUEL RATIO DETECTING ARRANGEMENT AND METHOD THEREFOR FOR AN INTERNAL COMBUSTION ENGINE

BACKGROUND AND SUMMARY OF THE INVENTION

The present invention relates to an air fuel ratio detecting arrangement using a diffusion suppressing type air fuel ratio sensor applicable to an air fuel ratio control unit for an internal combustion engine and the method therefor, and, in particular, relates to an air fuel ratio detecting arrangement using a diffusion suppressing type air fuel ratio sensor applicable to an air fuel ratio control unit for an electronic fuel injection type internal combustion engine for a motor vehicle and the method therefor.

The output characteristics of a diffusion suppressing type air fuel ratio sensor varies during long term use because of clogging of the porous gas diffusion suppressing portion thereof through deposition of exhaust gas components and generation of cracks therein due to thermal shock caused by combustion gas. Further, the output characteristics of a diffusion suppressing type air ratio sensor varies depending upon atmospheric air pressure to cause errors in detected air fuel ratio, in such a way that an air fuel ratio set for the motor vehicle shifts toward a lean side to thereby cause the driving performance of the motor vehicle to deteriorate.

JP-A-62-79344(1987), which corresponds to U.S. Pat. No. 4,676,213, discloses calibration of output characteristics change of a diffusion suppressing type air fuel ratio sensor due to secular change of the diffusion layer wherein maximum outputs thereof are sampled and renewed by the latest one, and the output characteristic of the sensor is calibrated every time when the maximum output is renewed with the renewed maximum output so as to compensate for secular change of the diffusion layer. The term "secular change" is defined as the change in the characteristics and performance of a sensor caused by aging of the sensor through the passage of time.

JP-A-62-267544(1987) discloses the calibration of output characteristic change for a diffusion suppression type air fuel ratio sensor due to secular change of the diffusion layer wherein detection signals at a predetermined air fuel ratio other than stoichiometric air fuel ratio is read and compared with the value of the initial detection signal to calibrate the sensor output characteristic so as to compensate for secular change of the diffusion layer.

JP-A-2-102447(1990), which corresponds to U.S. Pat. No. 4,944,274, discloses the calibration of the output characteristic change of a diffusion suppressing type air fuel ratio sensor due to secular change of the diffusion layer wherein variation of a diffusion coefficient from an initial value is detected and the output characteristic of the sensor is calibrated based on the detected variation so as to compensate for secular change of the diffusion layer. In the above mentioned prior diffusion suppressing type air fuel ratio sensors, the calibration of the output characteristic change is principally determined based on secular change of the diffusion layer. Other parameters affecting the detection accuracy of such diffusion suppressing type air fuel ratio sensors are not sufficiently taken into account.

An object of the present invention is to provide an air fuel ratio detecting arrangement and method therefor for an internal combustion engine having a high detection accuracy over a long use term thereof.

According to one aspect of the present invention, the above object is achieved by incorporating in an air fuel ratio detecting arrangement an atmospheric air pressure correction means in a signal processing and outputting means for correcting an output voltage signal processed therein based on a change in atmospheric air pressure which is detected when a predetermined operating condition of an internal combustion engine is satisfied in addition to an air calibration means.

According to another aspect of the present invention the above object is achieved by incorporating in an air fuel ratio detecting arrangement a secular change correction means included in a signal processing and outputting means for detecting a change in electromotive force of a concentration cell portion of a diffusion suppressing type air fuel ratio sensor when a predetermined rich air fuel ratio is reached and for correcting a reference voltage for the diffusion suppressing type air fuel ratio sensor based on the detected change in electromotive force of the concentration cell portion in addition to an air calibration means.

According to a further aspect of the present invention, the above object is achieved by incorporating in an air fuel ratio detecting method the step of determining an atmospheric air pressure change when a predetermined operating condition of an internal combustion engine is satisfied, the step of correcting an output voltage signal obtained by processing a signal relating to an air fuel ratio from a diffusion suppressing type air fuel ratio sensor based on the determined atmospheric air pressure change, the step of determining a secular change in electromotive force of a concentration cell portion of the diffusion suppressing type air fuel ratio sensor when a predetermined rich air fuel ratio is reached and the step of correcting a reference voltage for the diffusion suppressing type air fuel ratio sensor based on the determined secular change in electromotive force of the concentration cell portion in addition to the step of calibrating the output voltage signal based on a calibration through atmospheric air.

DETAILED DESCRIPTION OF THE DRAWINGS

Hereinbelow, an embodiment according to the present invention of air fuel ratio detecting arrangements and methods therefor for an internal combustion engine according to the present invention is explained with reference to FIG. 1 through FIG. 4.

Figure 1:
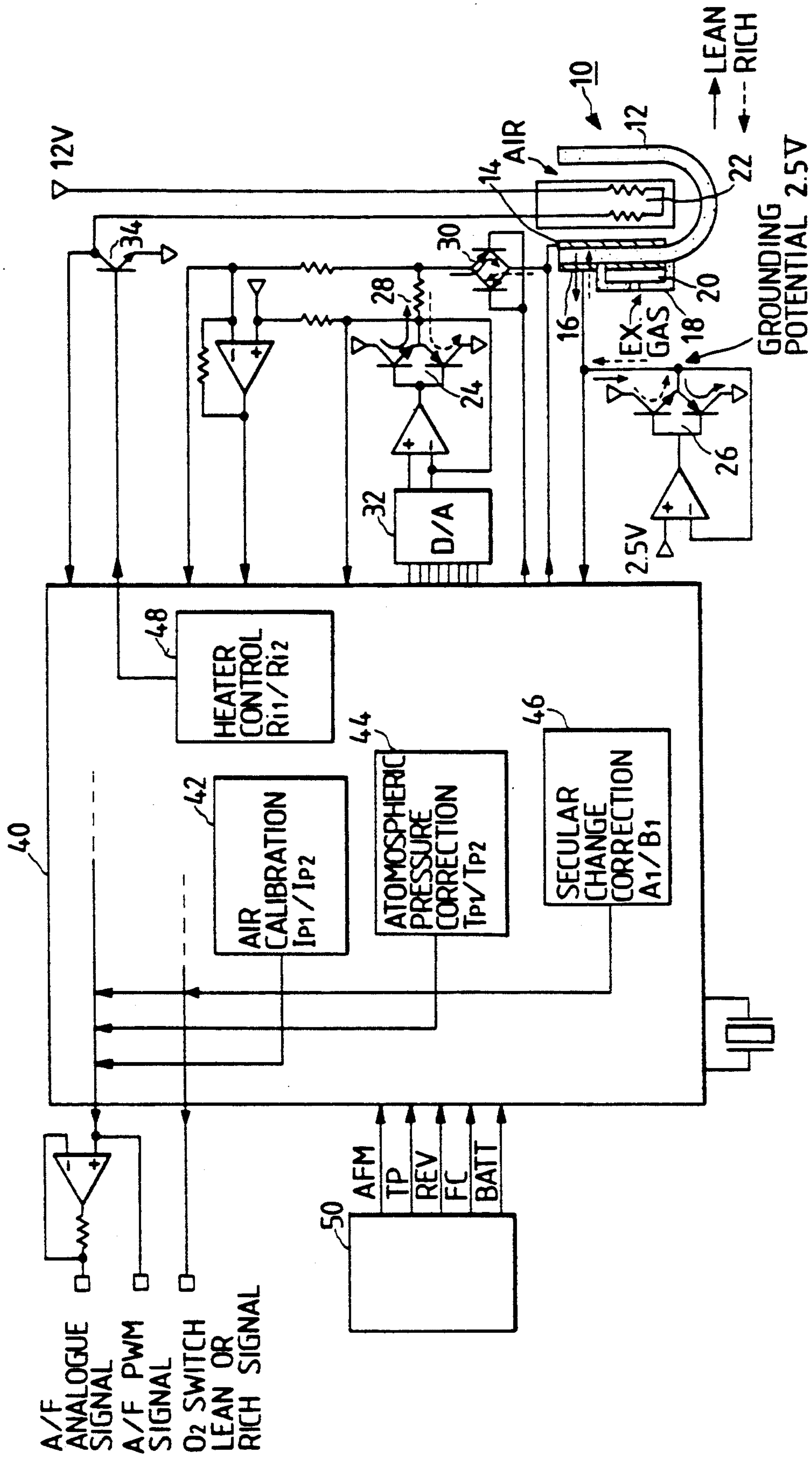
FIG. 1 is a block diagram of an embodiment of an air fuel ratio detecting arrangement according to the present invention.

In FIG. 1, a diffusion suppressing type air fuel ratio sensor comprises a concentration cell portion including a tubular Zirconia electrolyte 12 partially stabilized by yttria, a reference electrode 14 of porous platinum formed on one surface of the tubular Zirconia electrolyte 12 and exposed to atmospheric air, a detecting electrode 16 of porous platinum formed on the other surface of the tubular Zirconia electrode 12, a diffusion layer 18 covering the detecting electrode 16 and exposed to exhaust gas passing through an exhaust gas conduit for limiting gas diffusion and a diffusion chamber 20 formed between the detecting electrode 16 and the diffusion layer 18, and a heater portion 22 for maintaining the temperature of the tubular Zirconia electrolyte 12 sandwiched between the reference and detecting electrodes 14 and 16 at a predetermined range such as 650° C.±80° C.

A driving circuit for the diffusion suppressing type air fuel ratio sensor 10 includes first and second pairs of transistors 24 and 26 connected in complemental manner to permit bi-directional current flow through the tubular Zirconia electrolyte 12, a diffusion current detecting resistor 28 connected to the first pair of transistors 24, a switching transistor pair 30 connected between the diffusion current detecting resistor 28 and the reference electrode 14 for switching between a wide range linear air fuel ratio detection and a stepwise air fuel ratio detection with the diffusion suppressing type air fuel ratio sensor 10, a ladder circuit (D/A) 32 which converts digital output signals from a microcomputer 40 for the diffusion suppressing type air fuel ratio sensor 10 into analogue signals and a power transistor 34 for controlling current flowing through the heater portion 22. In the sensor driving circuit the detecting electrode 16 is maintained at a grounding potential of 2.5 V.

During the wide range linear air fuel ratio detection, the switching transistor pair 30 is turned on. The diffusion current Ip flowing through the Zirconia electrolyte 12 between the reference and detection electrodes 14 and 16 is controlled through the microcomputer 40 for the sensor 10 in such a manner that the electromotive force of the concentration cell portion is maintained constant, for example at 0.5 V, in other words, the ratio between oxygen partial pressure −Pa in the atmospheric environment ($2.09\times10^{-1}$ atm) and oxygen partial pressure Pd in the diffusion chamber ($2.09\times10^{-11}$ atm) is kept constant, for example, at $10^{10}$. When the exhaust gas flowing through is in a lean condition, a diffusion current indicated by dashed arrows flows through the sensor driving circuit, and when the exhaust gas is in a rich condition a diffusion current indicated by dashed arrows flows through the sensor driving current, and when the exhaust gas is in the stoichiometric condition no diffusion current flows. The magnitude and direction of the diffusion currents indicative of air fuel ratio are detected and processed in the microcomputer 40 for the sensor 10 and outputted such as in a form of an air fuel ratio pulse width modulated (A/F PWM) signal therefrom in a first predetermined period.

During the stepwise air fuel ratio detection, the switching transistor pair 30 is turned off to remove forced diffusion current control. An electromotive force induced in the concentration cell portion by an oxygen pressure difference between oxygen partial pressure Pa in the atmospheric environment and oxygen partial pressure Pe in the exhaust gas conduit is detected and processed in the microcomputer 40 for the sensor 10 to determine rich or lean condition with reference to a reference signal level applied to the diffusion suppressing type air fuel sensor 10 and outputted as an $0_2$ switch lean or rich signal therefrom.

During the wide range linear air fuel ratio detection, the internal resistance Ri of the concentration cell portion of the sensor 10 is detected and determined in the microcomputer 40 for the sensor 10 at a second predetermined period which is determined longer than the first predetermined period for the air fuel ratio outputting by making use of the diffusion current Ip and the voltage appearing across the reference and detecting electrodes 14 and 16. Based on the determined internal resistance Ri a heater control 48 in the microcomputer 40 for the sensor 10 controls the on and off duty cycle of the power transistor 34 so as to maintain the internal resistance Ri in a predetermined range, in other words, to maintain the temperature of the Zirconia electrolyte 12 in a predetermined range during both wide range linear air fuel ratio detection operation and stepwise air fuel ratio detection operation.

The microcomputer 40, which controls the sensor driving circuit and processes the signals from the diffusion suppressing type air fuel ratio sensor 10, further includes an air calibration function 42, an atmospheric pressure correction function 44 and a secular change correction function 46, and receives signals relating to instant engine operating conditions such as air flow rate AFM, fuel injection time Tp, engine rotational number REV, fuel cut-off signal FC and battery voltage BATT from a main microcomputer 50 for the engine control unit. These signals are used to determine a timing for initiating the air calibration or the atmospheric pressure correction.

Figure 2:
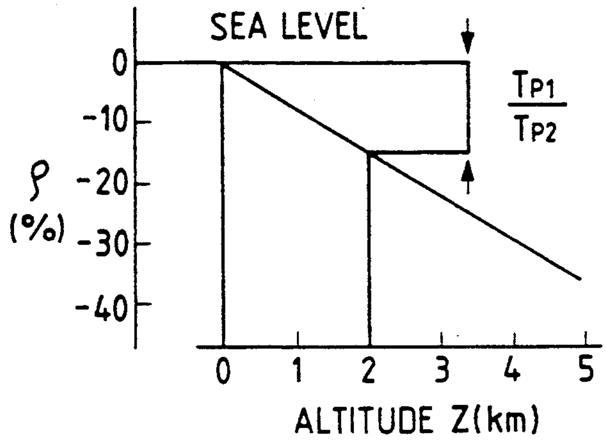
FIG. 2 is a graph for explaining atmospheric pressure correction performed in a microcomputer for drive control and signal processing of a diffusion suppressing type air fuel ratio sensor, in particular, in a atmospheric pressure correction as shown in FIG. 1.

Now, the atmospheric pressure correction 44 in the microcomputer 40 for the sensor 10 is explained with reference to FIG. 2, which illustrates a general reduction tendency of a basic fuel injection time, for example, from one $Tp_1$ at sea level to another $Tp_2$ at a higher altitude under a same engine operating condition determined by parameters such as air flow rate Q, engine rotational speed N, throttle valve opening degree $\theta$, intake air temperature t, cooling water temperature Tw and battery voltage $V_B$. The atmospheric pressure control 44 reads a basic fuel injection time $Tp_2$ when a predetermined engine operating condition is satisfied and compares the same ($Tp_2$) with a reference basic fuel injection time Tp, obtained at sea level under the same engine operating condition to determine atmospheric pressure at that moment. The control 44 reads out a correction coefficient of air fuel ratio signal from a look-up table which is obtained in advance through known testing procedures and stored in a memory in the microcomputer 40 based on the determined atmospheric pressure. The processed air fuel ratio signal to be outputted such as an A/F PWM signal is then corrected based on the read-out correction coefficient. Accordingly, dependency on atmospheric pressure in the output characteristic of air fuel ratio sensors is corrected and a proper driving performance of the motor vehicle using such an air fuel ratio sensor is obtained.

The air calibration 42 in the microcomputer 40 for the sensor 10 is now explained with reference to FIG. 3, which illustrates diffusion current $I_P$ or pumping current flowing through the Zirconia electrolyte 12 with respect to a stoichiometric air flow ratio λ and air flow ratio, and sensor output voltage signal converted and developed from the corresponding detected diffusion current Ip with respect to stoichiometric air flow ratio λ and air flow ratio.

The solid curve $\lambda=F(Ip)$ indicates an initial diffusion current characteristic of a specific diffusion suppressing type air fuel ratio sensor installed in the air fuel ratio detecting arrangement shown in FIG. 1 or a standard diffusion current characteristic of a diffusion suppressing type air fuel ratio sensor of the same type. The diffusion current Ip corresponding to a stoichiometric air fuel ratio λ from about 0.8 to 1.5 is converted and developed into a sensor unit output voltage signal to cover substantially the full span of 0∼5 v.

Every time when the detection electrode 16 of the air fuel sensor 10 is exposed to atmospheric air through the diffusion layer 18, in other words, the exhaust gas conduit is connected to atmospheric air such as via a fuel cut of the internal combustion engine, a diffusion current $Ip_2$ is detected to calibrate the initial diffusion current Ip, at the reference condition. A correction coefficient $\alpha_2=Ip_1/Ip_2$ is obtained and thereafter a detected diffusion current is corrected by making use of the latest obtained correction coefficient $\alpha_2=Ip_1/Ip_2$ and then a corresponding sensor unit output voltage signal is determined based on the corrected diffusion current.

The dotted diffusion current shows an estimated current described according to the detected diffusion current $Ip_2$ which is obtained some time after the detection of the initial diffusion current $Ip_1$.

Figure 3:
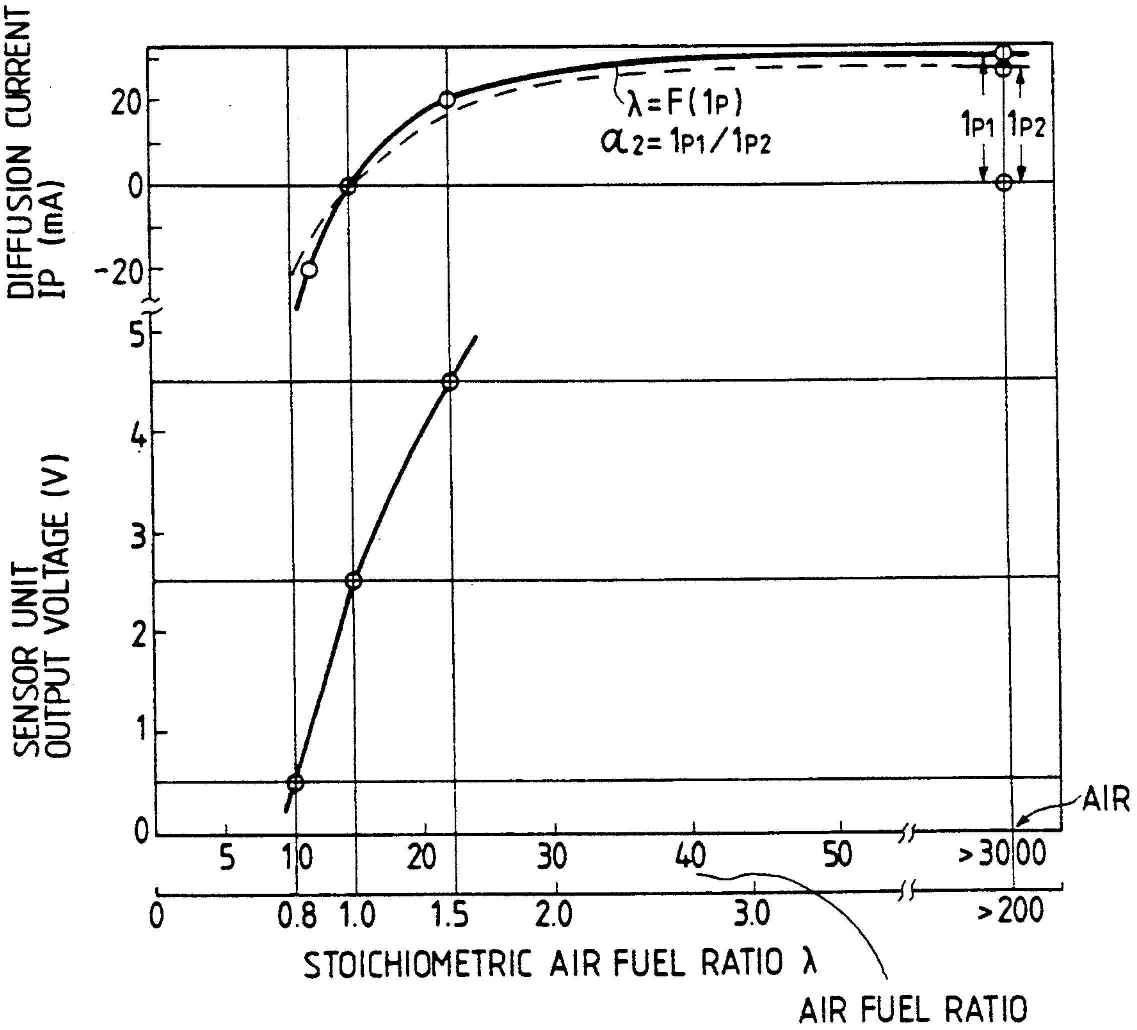
FIG. 3 is a graph for explaining air calibration performed in the microcomputer for drive control and signal processing of the diffusion suppressing type air fuel ratio sensor, in particular, in an air calibration as shown in FIG. 1.

In FIG. 3, the full range of 0∼5V span of the sensor unit output voltage signal covers the stoichiometric air fuel ratio λ of 0.8∼1.5, however the full span covering range can be varied depending upon engine types to which the present air fuel ratio detecting arrangement is applied such as a lean burn gasoline engine and a diesel engine, and upon a required resolution of the sensor unit output voltage signal.

The internal resistance of the concentration cell portion is maintained substantially constant by controlling the temperature of the Zirconia electrolyte 12 within a predetermined range such as 650° C.±80° C. which is carried out by controlling current flowing through the power transistor 34 for the heater portion 22 by means of on-off duty cycle control of the power transistor 34. However, the predetermined internal resistance of the concentration cell portion can be varied depending upon required engine operating conditions such as reduction of electric power consumption in heater current, upon detection accuracy of the diffusion current such as resolution of the diffusion current, and upon ambient temperature.

In certain embodiments of the invention, a standard diffusion current characteristic curve of a diffusion suppressing type air fuel ratio sensor of the same type is stored in a memory of the microcomputer 40 for the sensor 10 before installing a specific sensor 10 to the air fuel ratio detecting arrangement. In these embodiments, a diffusion current characteristic of the newly installed specific sensor is calibrated when the exhaust gas conduit is first connected to atmospheric air and the newly installed sensor is first exposed to the atmospheric air during operation of the internal combustion engine such that initial dispersion in diffusion current characteristics of respective sensors is easily compensated for.

Figure 4:
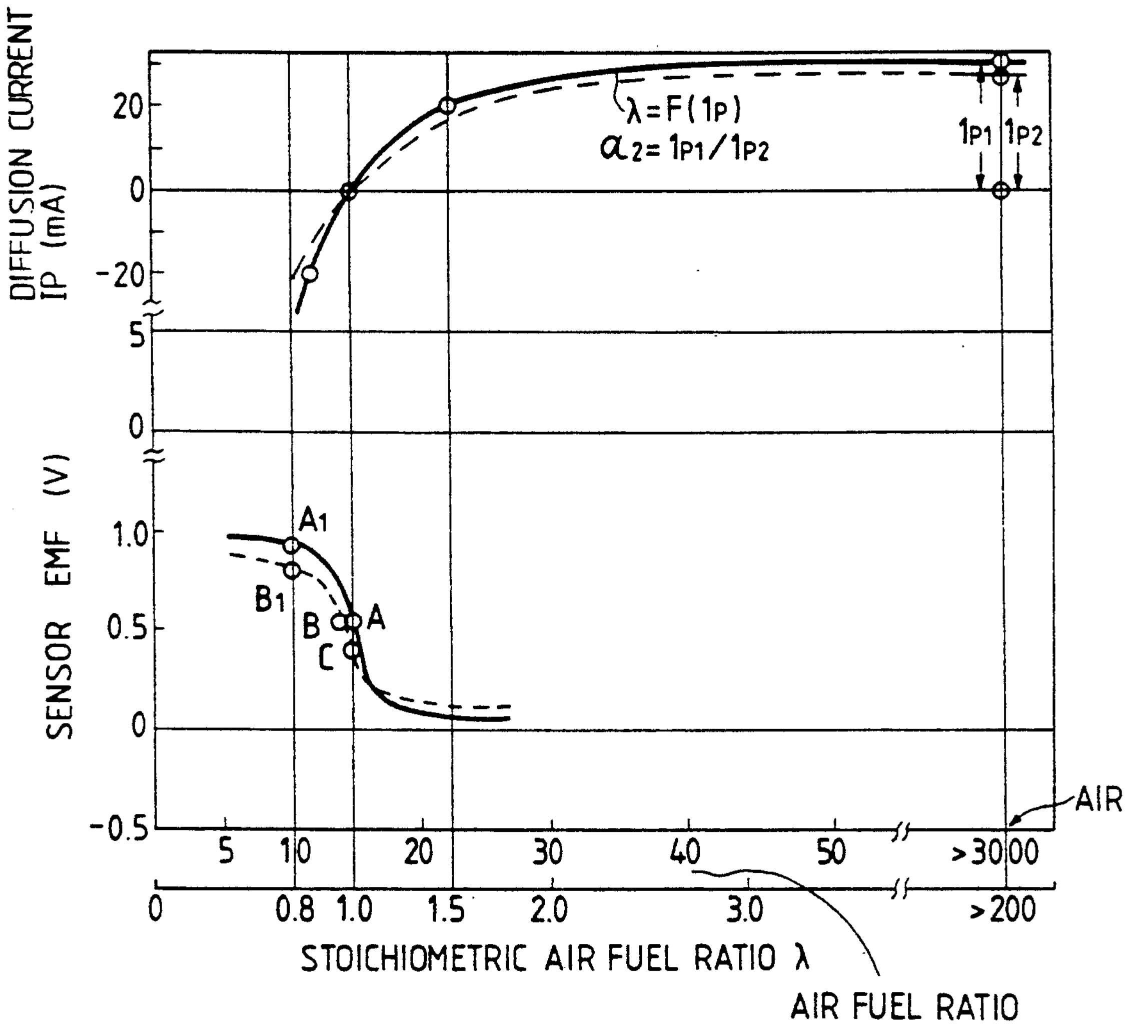
FIG. 4 is a graph for explaining secular change correction performed in the microcomputer for drive control and signal processing of the diffusion suppressing type air fuel ratio sensor, in particular, in a secular change correction as shown in FIG. 1.

The secular change correction 46 in the microcomputer 40 for the sensor 10 is explained with reference to FIG. 4, which illustrates sensor EMF when the air fuel ratio sensor 10 is operated as an ordinary $0_2$ sensor with respect to stoichiometric air fuel ratio and air fuel ratio, in addition to the same diffusion current curve $\lambda=F(Ip)$ with respect to stoichiometric air fuel ratio λ and air fuel ratio as illustrated in FIG. 3.

The electromotive force induced in the concentration cell portion reduces during long term use thereof due to deterioration, in particular, the reference and detecting electrodes 14 and 16 of porous platinum serving also as a catalyst. The solid stepwise curve illustrates an initial sensor EMF curve with respect to stoichiometric air fuel ratio λ and air fuel ratio, and the dotted stepwise curve illustrates an estimated sensor EMF curve after long term use. When an internal combustion engine is feed-back controlled to stay at $\lambda=1$ using a slice line passing through A-B without noting the secular change of the sensor EMF curve such as illustrated by the dotted stepwise curve, the feed-back control is performed with reference to point B somewhat shifted to rich side from point A of $\lambda=1$.

For avoiding the above inconvenience due to secular change of the sensor EMF, a sensor EMF $B_1$ corresponding to a predetermined rich stoichiometric air fuel ratio such as $\lambda=0.8$ is detected when the predetermined $\lambda=0.8$ is reached, and compared with an initial sensor EMF $A_1$. Based on the comparison result of $A_1/B_1$, the amount of shift from point A to point B is determined from estimated sensor EMF curves prepared in advance through experimentations in relation to sensor EMFs at a predetermined rich stoichiometric air fuel ratio such as $\lambda=0.8$. Then, based upon the determined shifted amount the slice level is corrected, for example, from the slice level passing through A-B to the level passing through point C with reference to a relationship between the shift amount and slice level which is also prepared in advance through experimentations.

Further, by making use of the determined secular change in electromotive force of the concentration cell portion, the level of the predetermined electromotive force which is kept constant during the wide range linear air fuel ratio detection can be altered.

Figure 5A:
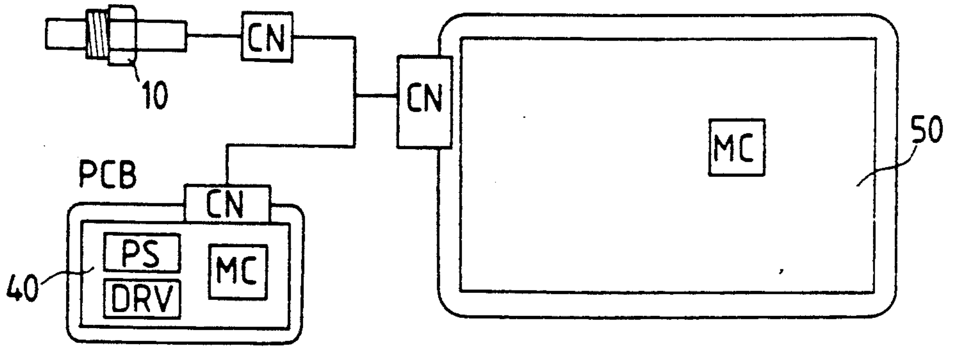
FIG. 5(*a*), 5(*b*) and 5(*c*) are three examples of packaging layouts of the air fuel ratio detecting arrangement according to the present invention in relation to a main microcomputer for an engine control unit for an internal combustion engine.
Figure 5B:
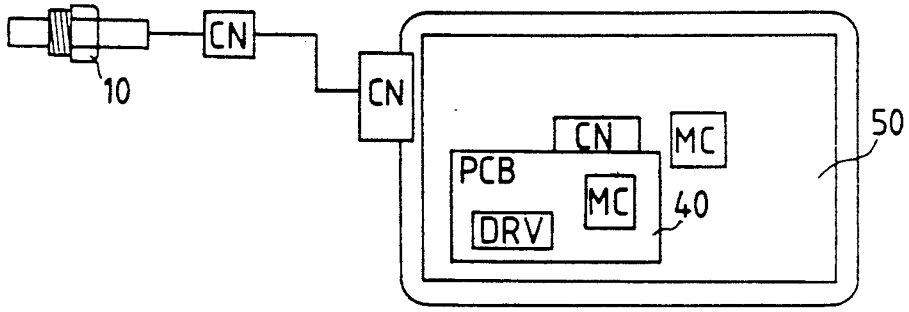
Figure 5C:
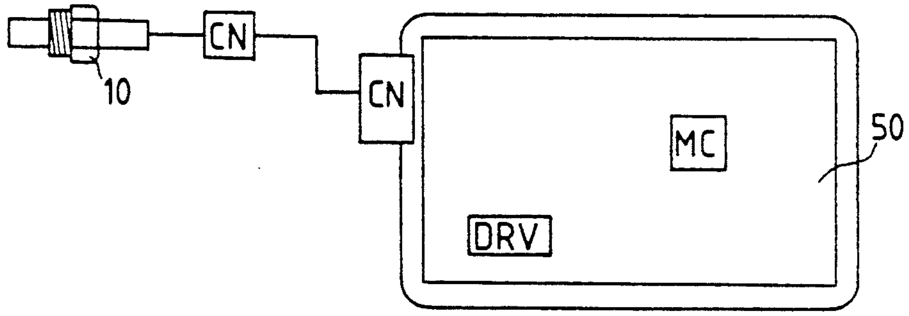

FIGS. 5(*a*), 5(*b*) and 5(*c*) are three examples of packaging layouts of the air fuel ratio detecting arrangement heretofore explained in relation to the main microcomputer 50 in the engine control unit for an internal combustion engine.

FIG. 5(*a*) shows a stand alone type air fuel ratio detecting arrangement with respect to the main microcomputer 50 in the engine control unit, which is similar to that illustrated in FIG. 1. The packaging layout shown in FIG. 5(*a*) is convenient when the air fuel ratio detecting arrangement according to the present invention is required to be combined with an already installed engine control unit.

FIG. 5(*b*) shows a built-in type air fuel ratio detecting arrangement with respect to the main microcomputer 50 in the engine control unit wherein the sensor driving circuit and the microcomputer for the sensor are mounted on an auxiliary printed circuit board (PCB) which is combined with the main printed circuit board for the engine control unit.

FIG. 5(*c*) shows an integrated type air fuel ratio detecting arrangement in which the main microcomputer 50 for the engine control unit is designed also to serve as the microcomputer 40 for the air fuel ratio sensor 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An air fuel ratio detecting arrangement for an internal combustion engine comprising:

a diffusion suppressing type air fuel ratio sensor having a concentration cell portion and a heater portion for controlling the temperature of the concentration cell portion, said diffusion suppressing type air fuel ratio sensor being disposed in an exhaust gas conduit of the internal combustion engine and providing substantially linear output signals from rich to lean indicative of air fuel ratios of intake air fuel mixture and stepwise output signals indicative of stoichiometry of intake air mixture based on an oxygen content and unburnt gas content in exhaust gas flowing through the exhaust gas conduit;

sensor driving means for driving said diffusion suppressing type air fuel ratio sensor in a first driving condition for inducing the substantially linear output signals from rich to lean indicative of air fuel ratios of air fuel mixture and for further driving said diffusion suppressing type air fuel ratio sensor in a second driving condition for inducing the stepwise output signals indicative of the stoichiometry of the intake air fuel mixture;

signal processing and outputting means for processing the substantially linear output signals and the stepwise output signals from said diffusion suppressing type air fuel ratio sensor and outputting substantially linear output voltage signals and stepwise output signals having either a high voltage level or a low voltage level at a first predetermined period, said signal processing and outputting means including air calibration means for calibrating a reference level of the substantially linear output signal of said diffusion suppressing type air fuel ratio sensor corresponding to atmospheric air when the exhaust gas conduit is connected to atmospheric air and for correcting levels of the substantially linear output voltage signals to be outputted based on the calibrated reference level, and further including atmospheric pressure correction means for determining an atmospheric pressure change when a predetermined operating condition of the internal combustion engine is satisfied and for correcting the level of the substantially linear output voltage signals to be outputted based on the determined atmospheric pressure change.

2. An air fuel ratio detecting arrangement for an internal combustion engine according to claim 1, wherein said signal processing and outputting means further includes secular change correction means for said diffusion suppressing type air fuel ratio sensor for detecting a high level of the stepwise output signals when a predetermined rich air fuel ratio condition is reached, comparing the detected high level with a previous level at the same predetermined rich air fuel ratio condition and correcting a reference voltage determined for operating said diffusion suppressing type air fuel ratio sensor based on the comparison result.

3. An air fuel ratio detecting arrangement for an internal combustion engine according to claim 2, wherein the first driving condition for said sensor driving means is achieved by maintaining an electromotive force in the concentration cell portion of the diffusion suppressing type air fuel ratio sensor constant by controlling magnitude and direction of diffusion current flowing therethrough and the second driving condition is achieved by removing constant electromotive force while maintaining internal resistance of the concentration cell portion substantially constant.

4. An air fuel ratio detecting arrangement for an internal combustion engine according to claim 2, wherein the substantially linear output voltage signals range between 0V to 5V.

5. An air fuel ratio detecting arrangement for an internal combustion engine according to claim 2, further comprising means for suppressing the correction of the level of the substantially linear output voltage signals by said atmospheric pressure correction means when the detected atmospheric pressure change is below a predetermined value.

6. An air fuel ratio detecting arrangement for an internal combustion engine according to claim 2, wherein the signal processing and outputting means includes a look-up table, and wherein the level of the substantially linear output voltage signal to be outputted from said signal processing and outputting means is corrected by use of a correction coefficient in the look-up table for the atmospheric pressure change determined by said atmospheric pressure correction means.

7. An air fuel ratio detecting arrangement for an internal combustion engine according to claim 2, further comprising means for activating said air calibration when fuel fed to the internal combustion engine is cut off.

8. An air fuel ratio detecting arrangement for an internal combustion engine according to claim 2, wherein said sensor driving means includes means for detecting resistance of the cell portion of said diffusion suppressing type air fuel ratio sensor at a second predetermined period to determine the temperature of the concentration cell portion and for controlling heater current flowing through the heater portion for maintaining the temperature of the concentration cell portion at a first predetermined temperature based on the determined temperature.

9. An air fuel ratio detecting arrangement for an internal combustion engine according to claim 8, further comprising means for changing the first predetermined temperature for the concentration cell of said diffusion suppressing type air fuel ratio sensor to a second predetermined temperature depending on the ambient temperature.

10. An air fuel ratio detecting arrangement for an internal combustion engine according to claim 8, wherein the second predetermined period for determining the temperature of the concentration cell portion of said diffusion suppressing type air fuel ratio sensor is set longer than that of the first predetermined period for outputting the substantially linear output voltage signals and stepwise output signals having either high voltage level or low voltage level from said signal processing and outputting means.

11. An air fuel ratio detecting method for an internal combustion engine comprising the steps of:

driving in a first driving step a diffusion suppressing type air fuel ratio sensor having a concentration cell portion and a heater portion for controlling the temperature of the concentration cell portion disposed in an exhaust gas conduit of the internal combustion engine in such a manner that electromotive force induced in the concentration cell portion is maintained by controlling magnitude and direction of diffusion current flowing therethrough while maintaining internal resistance of the concentration cell portion substantially constant;

driving in a second driving step the diffusion suppressing type air fuel ratio sensor in such a manner that the diffusion current control is removed to detect an electromotive force induced by oxygen content in exhaust gas passing through the exhaust gas conduit while also maintaining the internal resistance of the concentration cell portion substantially constant;

processing the magnitude and direction of the diffusion current signal from the diffusion suppressing type air fuel ratio sensor during the first driving step and the induced electromotive force signal therefrom during the second driving step into signals suitable for outputting;

calibrating a reference level of the diffusion current signal when the diffusion suppressing type air fuel ratio sensor is exposed to atmospheric air and correcting the processed signals corresponding to the diffusion current signals to be outputted based on the calibrated reference level;

determining an atmospheric pressure change when a predetermined operating condition of the internal combustion engine is satisfied and correcting the processed signals corresponding to the diffusion current signals to be outputted based on the determined atmospheric pressure change; and detecting a secular change in electromotive force of the concentration cell portion when a predetermined rich air fuel ratio condition is reached and correcting a reference voltage set of operating the diffusion suppressing type air ratio sensor based on the detected secular change.

12. An air fuel ratio detecting arrangement for an internal combustion engine comprising:

a diffusion suppressing type air fuel ratio sensor having a concentration cell portion and a heater portion that controls the temperature of the concentration cell portion, said air fuel ratio sensor being disposed in an exhaust gas conduit of the internal combustion engine and providing substantially linear output signals from rich to lean indicative of air fuel ratios of intake air fuel mixture and stepwise output signals indicative of stoichiometry of intake air mixture based on an oxygen content and unburnt gas content in exhaust gas flowing through the exhaust gas conduit;

a sensor driver coupled to the air fuel ratio sensor and which drives the air fuel ratio sensor in a first driving condition to induce substantially linear output signals from rich to lean indicative of air fuel ratios of air fuel mixture, and in a second driving condition to induce the stepwise output signals indicative of the stoichiometry of the intake air fuel mixture;

a signal processing and output circuit, coupled to the air fuel ratio sensor, which processes the substantially linear output signals and the stepwise output signals from the air fuel ratio sensor and outputs substantially linear output voltage signals and stepwise output signals having either a high voltage level or a low voltage level at a first predetermined period, the signal processing and output circuit including:

an air calibration device that calibrates a reference level of the substantially linear output signal of the air fuel ratio sensor corresponding to atmospheric air when the exhaust gas conduit is connected to atmospheric air and for correcting levels of the substantially linear output voltage signals to be outputted based on the calibrated reference level, and an atmospheric pressure correction circuit that determines an atmospheric pressure change when a predetermined operating condition of the internal combustion engine is satisfied and corrects the level of the substantially linear output voltage signals to be outputted based on the determined atmospheric pressure change.

* * * * *